United States Patent
Gargulak et al.

(10) Patent No.: US 8,221,709 B2
(45) Date of Patent: Jul. 17, 2012

(54) HARDWOOD LIGNOSULFONATES FOR SEPARATING GANGUE MATERIALS FROM METALLIC SULFIDE ORES

(75) Inventors: Jerry D. Gargulak, Ringle, WI (US); Lori L. Bushar, Weston, WI (US)

(73) Assignee: LignoTech USA, Inc., Rothschild, WI (US)

( * ) Notice: Subject to any disclaimer, the term of this patent is extended or adjusted under 35 U.S.C. 154(b) by 97 days.

(21) Appl. No.: 12/675,702

(22) PCT Filed: Aug. 29, 2008

(86) PCT No.: PCT/US2008/074732
§ 371 (c)(1),
(2), (4) Date: Feb. 26, 2010

(87) PCT Pub. No.: WO2009/029753
PCT Pub. Date: Mar. 5, 2009

(65) Prior Publication Data
US 2010/0233050 A1    Sep. 16, 2010

Related U.S. Application Data

(60) Provisional application No. 60/969,222, filed on Aug. 31, 2007.

(51) Int. Cl.
*B03D 1/00* (2006.01)
(52) U.S. Cl. ............................. 423/26; 423/89; 423/99
(58) Field of Classification Search ..................... 423/26
See application file for complete search history.

(56) References Cited

U.S. PATENT DOCUMENTS

| | | |
|---|---|---|
| 4,293,459 A | 10/1981 | Detroit |
| 4,645,535 A | 2/1987 | Little |
| 4,731,113 A | 3/1988 | Little |
| 4,877,517 A | 10/1989 | Bulatovic et al. |
| 4,880,529 A | 11/1989 | Bulatovic et al. |
| 4,952,329 A | 8/1990 | Bulatovic et al. |
| 5,049,612 A | 9/1991 | Bulatovic et al. |
| 5,575,334 A | 11/1996 | Clough |
| 5,693,692 A | 12/1997 | Bulatovic et al. |
| 5,929,408 A * | 7/1999 | Gutierrez et al. ............ 209/166 |
| 6,227,294 B1 | 5/2001 | Chatterji et al. |
| 6,238,475 B1 | 5/2001 | Gargulak et al. |
| 6,409,978 B1 * | 6/2002 | Faulkner et al. .................. 423/1 |

FOREIGN PATENT DOCUMENTS

| WO | WO 89/10792 | 5/1989 |
| WO | WO 89/10792 | 11/1989 |

OTHER PUBLICATIONS

WO 2009/029753; International Search Report; issued Dec. 12, 2008.
PCT/US2008/074732; PCT International Search Report; Dec. 12, 2008.

* cited by examiner

*Primary Examiner* — Melvin C Mayes
*Assistant Examiner* — Melissa Stalder
(74) *Attorney, Agent, or Firm* — Andrus, Sceales, Starke & Sawall, LLP

(57) ABSTRACT

Disclosed are compositions and methods for separating gangue material from metallic sulfide ores. The compositions typically include a lignosolfonate and do not include a cyanide salt. Suitable lignosulfonates may include lignosulfonates, for example hardwood lignosulfonate having a weight average molecular weight of about 3 kDa to about 12 kDa and having a relatively low sulfur content and a relatively low sulfonate content.

35 Claims, 6 Drawing Sheets

HARDWOOD LIGNOSULFONATES FOR SEPARATING GANGUE MATERIALS FROM METALLIC SULFIDE ORES

CROSS-REFERENCE TO RELATED APPLICATIONS

This application is the U.S. national stage application of International Application PCT/US2008/074732, filed Aug. 29, 2008, which international application was published on Mar. 5, 2009, as International Publication WO2009/029753 in the English language. The International Application claims priority of U.S. Provisional Patent Application 60/969,222, filed Aug. 31, 2007.

BACKGROUND

The invention relates to compositions which contain and methods which utilize lignosulfonates for separating gangue materials from metallic sulfide ores.

Froth flotation is a physical-chemical method of recovering, concentrating, or isolating ground ores. The process involves chemical treatment of an ore pulp or slurry to create conditions favorable for the attachment of selected mineral particles to air bubbles created by passing a stream of air through the ore pulp or slurry. The air bubbles carry the selected minerals to the surface of the pulp and form a stabilized froth which is skimmed from the surface and contains the selected mineral particles. Other non-selected minerals remain dispersed in the pulp or slurry.

Froth flotation has been used as a method for concentrating valuable metallic sulfides for about a century. In froth flotation, sulfide mineral particles in an ore slurry are treated with a processing agent (or collector) that facilitates their flotation and transport by the air bubbles to the surface of the slurry, where the frothed fraction forms. This process has proven to be an economic method of concentrating many simple sulfide ores, where relatively non-selective oils may be used as collectors. However, more complex ores having gangue materials, such as Cu—Fe, Cu—Pb—Zn—Fe, Pb—Zn—Fe, Cu—Zn—Fe, and Cu—Ni—Fe ores require a process that is more selective. Gangue materials typically are considered to include iron containing compounds such as the iron-sulfur compounds pyrrhotite, pyrite, and marcasite. Iron is undesirable because it has to be removed in the smelting stage. Additionally, iron (e.g., in the form of pyrite) can effect efficiency of metal extraction in leaching reactions. Therefore, the less iron an ore contains after a concentration process, then the less costly final recovery of the desired ore will be.

The need to treat such complex sulfide ores has resulted in the development of more selective reagents and reagent combinations. Xanthates have proven to be useful as selective collectors for sulfide minerals. Another common method for obtaining a concentration of desirable metallic sulfides is to depress gangue materials during the flotation of sulfide ore. Sodium cyanide, sodium hydrosulfide, and sodium thiophosphates commonly are used as selective flotation depressants in combination with selective collectors. For example, gangue material (e.g., pyrite) often are depressed by addition of large amounts of calcium hydroxide. In this process, the pH of the bulk slurry is increased and pyrite becomes hydrophilic. Materials rendered hydrophilic tend to be rejected during the flotation process. However, when lime addition is not an acceptable solution (for example where the process must be performed at an intermediate pH, or where iron compounds are not sufficiently rejected even at high pH) then sodium cyanide (or one of the above-mentioned reagents) is often used as a depressant for non-desired minerals, including iron sulfides. However, components like sodium cyanide are hazardous and toxic. As such, chemicals like sodium cyanide are highly regulated and require expensive handling equipment in order to use them in froth flotation.

This invention relates to the use of lignosulfonates during the flotation of sulfide ores. In particular, the invention relates to the use of lignosulfonates derived from hardwood sources. The disclosed lignosulfonate compositions are shown to be effective gangue depressants and provide a method for eliminating the use of hazardous or toxic chemicals, such as cyanides, during the flotation of massive sulfide ores. In particular, the disclosed lignosulfonate compositions are shown to act as a direct replacement for cyanide during the flotation of zinc, lead, and copper ores. These lignosulfonates compositions give equal or superior performance in comparison to other toxic gangue depressants such as sodium cyanide.

U.S. Pat. Nos. 5,693,692; 5,049,612; 4,952,329; 4,880,529; and 4,877,517 disclose gangue depressant compositions that include lignosulfonate. However, the lignosulfonate used in the gangue depressant compositions of these patents, i.e., Kelig 100, differs from the lignosulfonates used in the present application not only functionally but also structurally. First, Kelig 100 is processed in a different way than the lignosulfonates disclosed herein, which substantially increases the polymer's sulfonate and sulfur content and renders the polymer much more hydrophilic than the polymers used in the present disclosure. In addition, Kelig 100 tends to be of higher molecular weight that the hardwood lignosulfonate products disclosed herein. Furthermore, the gangue depressant compositions of these patents are mixtures that include additional ingredients as essential components, such as chemically-modified carbohydrate polymers (e.g., causticized starch), polyacrylates, quebracho, and dextrin. These patent do not disclose specific lignosulfonates that function as efficiently as sodium cyanide in gangue depressant compositions.

U.S. Pat. No. 5,575,334 also discloses the use of lignosulfonates for recovering metal from ore. However, the '334 patent does not disclose the use of specific lignosulfonates as described herein that function as efficiently as sodium cyanide in gangue depressant compositions.

U.S. Pat. Nos. 4,731,113; and 4,645,535 disclose leaching lixiviant compositions that include lignosulfonate. The compositions of these patents are mixtures that include additional ingredients as essential components, such as thiourea compounds and urea, and are used for non-flotation applications. Furthermore, these patents do not disclose specific lignosulfonates as described herein that function as efficiently as sodium cyanide in gangue depressant compositions.

SUMMARY

Disclosed are compositions and methods for separating gangue material from metallic sulfide ores. The compositions and methods typically relate to froth flotation processes for recovering, concentrating, or isolating metallic sulfide ores. The disclosed compositions typically include and the methods utilize a lignosulfonate and do not include a cyanide reagent (e.g., sodium cyanide). In some embodiments, the compositions include and the methods utilize a lignosulfonate comprising lignin obtained from a hardwood tree such as Eucalyptus, Maple or Birch trees. The methods typically do not include the use of a cyanide reagent (e.g., sodium cyanide), either as a gangue depressant or otherwise. The lignosulfonates used in the disclosed compositions and methods may have a relatively low sulfur or sulfonate content in comparison to lignosulfonates disclosed in the prior art.

The disclosed compositions may be used in methods related to recovering, concentrating, or isolating a metal sulfide from an ore. The methods may include preparing an ore slurry or pulp composition which includes: (a) ore, which optionally may be ground ore; (b) water; (c) a lignosulfonate or a salt thereof (e.g., a lignosulfonate or a salt thereof suitable as a gangue depressant); and (d) a processing reagent (e.g., a processing agent that facilitates separation of the metallic sulfide from gangue where the agent is selected from the group consisting of a flotation reagent, a frothing reagent, a collector reagent, and an extractor reagent.) In some embodiments, the processing reagent may facilitate foaming of the ore slurry upon introduction of air into the slurry. Typically, the slurry does not include cyanide or a salt thereof. The lignosulfonate typically is a hardwood lignosulfonate having a weight average molecular weight of about 3 kDa to about 12 kDa (preferably about 4 kDa to about 10 kDa, more preferably about 5.5 kDa to about 9 kDa). The molecular weight of lignosulfonate may be determined by size exclusion chromatography in combination with multi angle laser light scattering detection.

In some embodiments, the disclosed compositions may include a lignosulfonate having a relatively low sulfur or sulfonate content. For example, the disclosed lignosulfonates may have a sulfur content of less than about 10.0% (w/w) (preferably less than about 9.0% (w/w), or more preferably less than about 8% (w/w)). In further examples, the disclosed lignosulfonates may have a sulfonate content of less than about 7.5% (w/w) (preferably less than about 7.0% (w/w), more preferably less than about 6.5% (w/w), even more preferably less than about 6.0% (w/w)).

In some embodiments, the disclosed compositions may include a lignosulfonate having a relatively low pH in aqueous solution. For example, the disclosed lignosulfonates may have a pH of less than about 9.0 in aqueous solution. In other embodiments, the disclosed lignosulfonates may have a pH of less than about 8.5, 8.0 or 7.5 in aqueous solution.

The disclosed compositions may include lignosulfonate having a relatively high purity. In some embodiments, the lignosulfonate may have a relatively high purity as assessed by sugar content. In some embodiments, the disclosed compositions may include lignosulfonate having a sugar content of less than about 6.0% (w/w) (preferably less than about 5.0% (w/w), more preferably less than about 4.0% (w/w)).

In some embodiments, the disclosed compositions may include lignosulfonate having a relatively high hydrophobicity or a relatively low hydrophilicity in comparison to lignosulfonates in the prior art. Hydrophobicity and hydrophilicity can be measured using methods known in the art (e.g., hydrophobic interactive chromatography).

In some embodiments, the methods for recovering, concentrating, or isolating a metal sulfide from an ore may include the following steps: (a) adding a lignosulfonate or a salt thereof to the ore (e.g., a lignosulfonate or a salt thereof suitable as a gangue depressant); (b) adding at least one of a flotation reagent, a frothing reagent, a collector reagent, and an extractor reagent to the ore; (c) preparing an ore slurry, wherein the ore slurry has a pH that is basic; (d) introducing air into the ore slurry to create a frothed fraction, wherein the metal sulfide is at least partially suspended in the frothed fraction; and (e) removing the frothed fraction from the ore slurry, thereby recovering, concentrating, or isolating the metal sulfide; wherein the method does not comprise adding cyanide or a salt thereof to the ore or the ore slurry. Examples of metal sulfides recovered, concentrated, or isolated in the disclosed methods may include copper sulfides, zinc sulfides, lead sulfides, and mixtures thereof. Typically, the lignosulfonates used in the methods is a hardwood derived lignosulfonate having a weight average molecular weight of about 3 kDa to about 12 kDa (preferably about 4 kDa to about 10 kDa, more preferably about 5.5 kDa to about 9 kDa). Optionally, molecular weight may be determined by size exclusion chromatography (SEC) and/or multi-angle laser light scattering (MALLS). (See, e.g., Fredheim et al., J. CHROMATOGR. A. 2002 Jan. 4; 942(1-2):191-9).

In other embodiments, the methods may include the following steps: (a) preparing an ore slurry, (b) adding a lignosulfonate or a salt thereof to the ore slurry (e.g., a lignosulfonate or a salt thereof suitable as a gangue depressant); (c) adding at least one processing reagent to the ore slurry, the processing agent selected from the group consisting of a flotation reagent, a frothing reagent, a collector reagent, an extractor reagent and combinations thereof; (d) introducing air into the ore slurry to create a frothed fraction, where the metal sulfide is at least partially suspended in the frothed fraction; and (e) removing the frothed fraction from the ore slurry, thereby recovering, concentrating, or isolating the metal sulfide.

The gangue depressants disclosed herein may include lignosulfonate or a salt thereof. In some embodiments, the gangue depressant may consist of a lignosulfonate or a salt thereof. The gangue depressant may include a lignosulfonate comprising lignin obtained from a hardwood lignin tree. In some embodiments, suitable lignosulfonates a hardwood lignosulfonate (e.g., lignosulfonate derived from Eucalyptus, Maple or Birch lignin) having a weight average molecular weight of about 3 kDa to about 12 kDa (preferably about 4 kDa to about 10 kDa, more preferably about 5.5 kDa to about 9 kDa). Lignosulfonate salts may include but are not limited to sodium salts, potassium salts, and calcium salts.

In some embodiments, the disclosed methods relate to the use of lignosulfonates to replace hazardous or toxic depressants or to replace more complex mixtures of depressants for the separation of gangue material from valuable sulfide ores. Typically, the compositions do not include and the methods do not utilize a cyanide reagent such as sodium cyanide. In some embodiments, the methods do not include adding cyanide or a salt thereof (e.g., sodium cyanide) to the ore or the ore slurry (e.g., as a gangue depressant).

The lignosulfonates or salts thereof used in the disclosed compositions and methods may function as a gangue depressant (e.g., the lignosulfonates or salts thereof may be present at a concentration effective for depressing gangue in a flotation method for isolating a metallic sulfide). In some embodiments, the lignosulfonates function effectively as gangue depressants such that the composition does not include and the methods do not utilize additional reagents as gangue depressants. Typically, the compositions do not include and the methods do not utilize a cyanide (e.g., sodium cyanide), either as a gangue depressant or otherwise. In some embodiments, the compositions do not include and the methods do not utilize a chemically-modified carbohydrate such as a starch or dextrin which has been treated with an alkaline solution (e.g., a solution having a pH of about 12 to about 14), either as a gangue depressant or otherwise. In further embodiments, the compositions do not include and the methods do not utilize a polyacrylate, quebracho, dextrin, or guar gum, either as a gangue depressant or otherwise.

Lignosulfonates used in the compositions and methods may be added at an effective concentration for achieving a desired recovery rate and grade for a selected metal ore in a frothed fraction of an ore slurry. Lignosulfonates used in the compositions and methods may be added at an effective concentration for achieving gangue depression. For example, effective concentrations of lignosulfonates used in the compositions and methods may include but are not limited to at least about 50, 100, 175, 250, 325, 500, 1000, 1500, or 2000 grams per metric ton ore (g/mt). Ranges of concentrations for the lignosulfonates present in an ore or ore slurry are contemplated (e.g., ranges having as end-point concentrations about 50, 100, 175, 250, 325, 500, 1000, 1500, or 2000 g/mt, such as the ranges 250-500, 500-1000, and 1000-1500 g/mt).

The prepared ore slurry may include reagents to facilitate concentrating, isolating, or recovering metallic sulfides. For example, the prepared ore slurry may include reagents for adjusting or buffering the pH of the slurry. In some embodiments, the prepared ore slurry has a pH that is basic. For example, the methods may include adding a reagent to the ore or the ore slurry for increasing the pH of the ore slurry. In some embodiments, the prepared ore slurry has a pH that is greater than about 8 (or in further embodiments greater than about 10). The prepared ore slurry may have pH within a desirable range (e.g., about 9.5 to about 11.5). Additional reagents which may be added to the ore or the ore slurry include, but are not limited to, carbonates (e.g., sodium carbonate or soda ash), and hydroxides (e.g., calcium hydroxide or lime).

Typically, the disclosed compositions include and the methods utilize a processing reagent, which may be added to the ore or the ore slurry. The processing agent may be selected from the group consisting of a flotation reagent, a frothing reagent, a collector reagent, an extractor reagent, and combinations thereof. In some embodiments, the processing agent may include a surfactant. The processing reagent may include an aliphatic alcohol having 3-12 carbons which may be straight-chain, branched, or cyclic. For example, the additional reagent may include methylisobutylcarbinol (MIBC). The processing reagent may include a xanthate (e.g., sodium isopropyl xanthate). In further embodiments, the processing reagents may include a reagent selected from the group consisting of a phosphate (e.g., calcium phosphate), a sulfate (e.g., copper sulfate), a thionocarbamate, a thiophosphate, a thiourea, and combinations thereof.

In some embodiments, the methods relate to recovering copper (e.g., as copper sulfide) from an ore. The methods may be effective for recovering at least about 50, 55, 60, 65, or 70% (w/w) total copper from an ore where the copper grade is at least about 10, 15, or 20% (w/w) in a frothed fraction of an ore slurry.

In some embodiments, the methods relate to recovering zinc (e.g., as zinc sulfide) from an ore. The methods may be effective for recovering at least about 50, 55, 60, 65, or 70% (w/w) total zinc from an ore where the zinc grade is at least about 10, 15, or 20% (w/w) in a frothed fraction of an ore slurry.

In some embodiments, the methods relate to recovering lead (e.g., as lead sulfide) from an ore. The methods may be effective for recovering at least about 50, 55, 60, 65, or 70% (w/w) total lead from an ore where the lead grade is at least about 10, 15, or 20% (w/w) in a frothed fraction of an ore slurry.

Typically, the methods are effective for recovering, concentrating, or isolating a selected metal sulfide (e.g., copper sulfide, zinc sulfide, or lead sulfide) in a frothed fraction of an ore pulp or slurry and likewise are effective for removing or reducing iron compounds such as pyrrhotite, pyrite, and marcasite in a frothed fraction from an ore pulp or slurry. In some embodiments, the methods recover no more than about 20% (w/w) total iron from an ore slurry (based on iron present in a frothed fraction of the ore slurry). Preferably, the methods recover no more than about 18, 16, 14, 12, or 10% (w/w) total iron from an ore slurry. The methods may produce a frothed fraction of the ore slurry that has an enriched concentration of a selected metal sulfide (e.g., copper sulfide, zinc sulfide, or lead sulfide) versus iron compounds (e.g., pyrrhotite, pyrite, or marcasite), relative to the concentrations of the selected metal sulfide and iron compound in the total ore slurry.

Also disclosed are lignosulfonates. The disclosed lignosulfonates may include purified hardwood lignosulfonate (e.g., lignosulfonate derived from Eucalyptus, Maple or Birch lignin) having a weight average molecular weight of about 3 kDa to about 12 kDa (preferably about 4 kDa to about 10 kDa, more preferably about 5.5 kDa to about 9 kDa).

DETAILED DESCRIPTION

Figure 1:
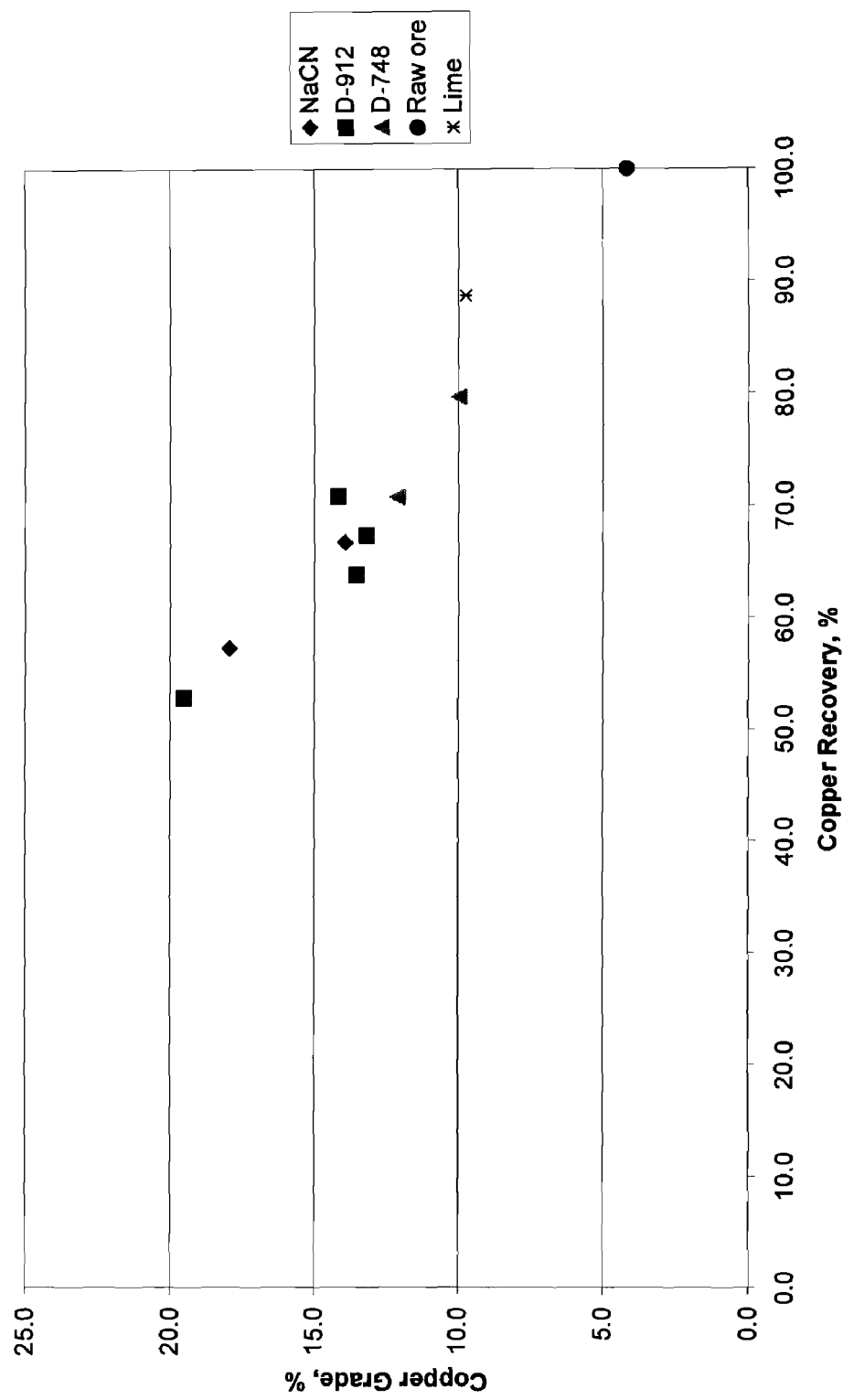
FIG. 1 is a plot graph of copper grade % (i.e., weight percentage copper in the concentrated ore) versus copper recovery % (i.e., weight copper in the concentrated ore relative to total weight copper in the ore).

The present invention is described herein using several definitions, as set forth below and throughout the application.

As used herein, "about", "approximately," "substantially," and "significantly" will be understood by persons of ordinary skill in the art and will vary to some extent on the context in which they are used. If there are uses of the term which are not clear to persons of ordinary skill in the art given the context in which it is used, "about" and "approximately" will mean plus or minus $\leq$10% of the particular term and "substantially" and "significantly" will mean plus or minus >10% of the particular term.

As used herein, the term "lignin" has its normal connotation, and refers to an amorphous polymer that occurs in woody material of higher plants such as trees. Lignin is composed of phenylpropanol groups (typically p-phenylpropanol groups) that are linked by various carbon-carbon linkages and ether linkages. Optionally, the phenyl moiety of the phenylpropanol group further is substituted by one or more methoxy groups adjacent to the phenyl moiety's hydroxyl group. The phenylpropanol groups of softwood lignin typically include fewer methoxy substitutions on the phenyl moiety (typically having one or no methoxy substitutions) than phenylpropanol groups of hardwood lignin (typically having two methoxy substitutions). Hardwood and softwood lignosulfonates can most easily be distinguished by UV (ultraviolet) analysis, as each type of lignosulfonate displays a characteristic absorption in the UV spectrum. Hardwood lignosulfonates typically display a UV maximum (λmax) from 276 to 277 nm in their UV spectrum, while softwood lignosulfonates typically display this maximum from 280 to 281 nm. In some embodiments, the hardwood lignosulfonates utilized in the presently disclosed compositions and methods may display a UV maximum from 276-277 nm.

Lignin typically is recovered from the organosolve process, or from alkaline black pulping liquors such as are produced in the Kraft, soda, and other well known alkaline pulping operations. The term "sulfonated lignin," as used in this specification, refers to the product which is obtained by the introduction of sulfonic acid groups into the lignin molecule, as may be accomplished by the reaction of lignin with sulfite or bisulfite compounds. For example, the waste liquors from such organosolve or alkaline pulping contain large quantities of lignin and lignin decomposition products, which can be sulfonated or sulfomethylated by known processes, such as high temperature sulfonation, oxidative sulfonation at ambient temperature, or sulfomethylation by reaction of lignin, sodium sulfite and formaldehyde. As used herein, the term "sulfite lignin" refers to the reaction product of lignin, which is inherently obtained during sulfite pulping of wood, straw, corn stalks, bagasse and the like, and is a principle constituent of the spent sulfite liquor which is derived from that process. The phrases "lignosulfonate" and "lignin sulfonate" may be used interchangeably herein and include the sulfonated lignin and sulfite lignin reaction products described above, and also spent sulfite liquors that may be further reacted, purified, fractionated, or the like, as may be required to produce the lignosulfonate material of interest. The lignosulfonates may be utilized in the "as is" or whole liquor condition. They may also be utilized as a purified lignosulfonate material from, or in which the sugars and other saccharide constituents have been removed and/or destroyed, or additionally inorganic constituents have been partially or fully eliminated. Lignosulfonates may be utilized in their salt form. For example, calcium lignosulfonates, sodium lignosulfonates, ammonium lignosulfonates, potassium lignosulfonates, magnesium lignosulfonates and mixtures or blends thereof. Lignosulfonates are available from numerous sources in either solution or dried power forms.

The disclosed compositions may include a lignosulfonate having a relatively low sulfur or sulfonate content. A lignosulfonate having "a relatively low sulfur content" may have a sulfur content of less than about 10.0% (w/w) (preferably less than about 9.0% (w/w), or more preferably less than about 8% (w/w)). A lignosulfonate having "a relatively low sulfonate content" may have a sulfonate content of less than about 7.5% (w/w) (preferably less than about 7.0% (w/w), or more preferably less than about 6.5% (w/w)).

The disclosed compositions may include a lignosulfonate having a relatively low pH in aqueous solution. A lignosulfonate having a relatively low pH in solution may have a pH of less than about 9.0 in aqueous solution (and preferably has a pH of less than about 8.5, 8.0 or 7.5 in aqueous solution).

The disclosed compositions and methods may utilize or include a purified sulfonated lignin. As disclosed herein, a "purified sulfonated lignin" may include a sulfonated lignin in which contaminants such as sugars and phenolic monomers and oligomers (e.g., polymers having fewer than about 10 monomers) have been removed such that at least about 90% of the dry matter is composed of sulfonated lignin salt (preferably at least about 95% of the dry matter is composed of sulfonated lignin salt). Optionally, high purity sulfonated lignin may be obtained by performing methods that include fermenting and/or ultrafiltering. Fermentation may be performed to provide lignosulfonate having a sugar content of less than about 6.0% (w/w) (preferably less than about 5.0% (w/w), and more preferably less than about 4.0% (w/w)). Purity may be assessed by determining methoxyl content of the lignosulfonate material. In some embodiments, the methoxyl content of lignosulfonate salt may be measured and corrected for the weight of the associated sulfonic groups and salt cation to calculate the purity of the sulfonated lignin salt using the typical methoxyl content of lignin in the calculation (e.g., about 14.6% methoxyl content for softwood lignin and about 21.4% methoxyl content for hardwood lignin).

The disclosed compositions and methods may utilize or include low molecular weight sulfonated lignin. Optionally, molecular weight may be determined by size exclusion chromatography (SEC) and/or multi-angle laser light scattering (MALLS). (See, e.g., Fredheim et al., J. CHROMATOGR. A. 2002 Jan. 4; 942(1-2):191-9 "Molecular weight determination of lignosulfonates by size exclusion chromatography and multi-angle laser light scattering"). As disclosed herein, a "high molecular weight sulfonated lignin" typically has a molecular weight that is greater than about 20 kDa (preferably greater than about 30 kDa, more preferably greater than about 40 kDa, and even more preferably greater than about 50 kDa), A "low molecular weight sulfonated lignin" typically has a molecular weight that is no more than about 20 kDa (preferably no more than 12 kDa, or more preferably no more than about 10 kDa).

The lignosulfonates used in the disclosed methods may be hardwood lignosulfonates. For example, the lignosulfonates used in the disclosed methods may comprise lignin isolated from the hardwood Eucalyptus, Maple or Birch trees. The hardwood lignosulfonates used in the disclosed methods typically have a weight average molecular weight of about 3 kDa to about 12 kDa (preferably about 4 kDa to about 10 kDa, more preferably about 5.5 kDa to about 9 kDa);

The lignosulfonates disclosed herein may be used in froth flotation methods as a gangue depressant. As used herein, a gangue depressant reduces the amount of floatable gangue (e.g., iron-containing compounds such as pyrrhotite, pyrite, or marcasite) in a froth flotation method for recovering metallic sulfides (e.g., copper, zinc, or lead sulfides). In froth flotation methods, a gangue depressant typically is effective at reducing the amount of a gangue material in the froth of an ore pulp or slurry, relative to an ore pulp or slurry that does not include a gangue depressant. Gangue depressant activity may be assessed by calculating a ratio x %/y %, where "x %" is the percentage recovery in the froth of a selected metallic sulfide relative to the total amount of the selected metallic sulfide in the ore slurry; and "y %" is the percentage recovery in the froth of gangue material relative to the total amount of the gangue material in the ore slurry. The lignosulfonates used in the disclosed methods may exhibit superior gangue depressant activity in comparison to other gangue depressants and other lignosulfonates (e.g., in comparison to technical grade softwood lignosulfonates).

The lignosulfonates disclosed herein may be added to an ore or an ore slurry at an effective amount of lignosulfonates per metric ton ore (e.g., g/mt effective for gangue depression). For example, the lignosulfonates may be added at an amount including, but not limited to about 50, 100, 175, 225, 350, 500, 1000, 1500, or 2000 g/mt ore (or ranges of these concentrations as contemplated herein). The lignosulfonates may be added to an ore or an ore slurry at an effective amount per metric ton ore in order to achieve a desired result (e.g., gangue depression). In some embodiments, the lignosulfonates may be added at an effective amount in order to achieve a reduction in the percentage of gangue recovered in a froth fraction versus total gangue in an ore slurry. For example, the lignosulfonates may be added at an amount of no more than about 2000 g/mt, 1500, g/mt, 1000 g/mt, or 500 g/mt (or preferably no more than about 325 g/mt, 250 g/mt, 175 g/mt, 100 g/mt, or 50 g/mt) (or ranges of these concentrations as contemplated herein) to achieve a reduction in the percentage gangue recovered in a froth fraction versus total gangue in an ore slurry of at least about 30% (or preferably at least about 40% and more preferably at least about 50%).

The froth flotation methods disclosed herein may utilize processing agents which may be added to an ore (which optionally may be ground) or to an ore pulp or slurry. Processing agents may include frothing reagents (or frothers), flotation agents (or floaters), collection agents (or collectors), extraction agents (or extractors), and combinations thereof. Processing agents may include surfactants (e.g., anionic, cationic, zwitterionic, or non-ionic surfactants). Processing agents may include one or more of the following: xanthates (e.g., potassium ethyl xanthate, sodium ethyl xanthate, sodium isopropyl xanthate, sodium isobutyl xanthate, potassium amyl xanthate, and potassium hexyl xanthate); phosphates and phosphoric acid esters (e.g., mono- or di-phosphoric acid esters); thiophosphates (e.g., aliphatic dithiophosphates and aromatic dithiophosphates); thiazoles (e.g., mercaptobenzthiazoles); carbamates such as thiocarbamates (e.g., thiocarbamic acid esters); fatty acids (e.g., having 4-22 carbons which may be straight-chain or branched); sulfates (e.g., sodium alkylsulfates), sarcosides; succinates (e.g., alkyl sulfo succinates); succinic acid esters (e.g., alkenyl succinic acid half esters or sulfo succinic acid esters); succinamates (e.g., alkyl sulfo succinamate); primary amines, diamines, or tertiary amines; fatty alkyl propylene diamines; alkyl ether propylene amine; alkyl ether propylene diamines; quaternary ammonium chloride; imidazolines; alkyl phenol polyglycol ether; fatty acid polyglycol esters; propylene glycol; alkyl polypropylene glycol ethers; alkyl polyglycol ethers; aliphatic alcohols (e.g., aliphatic alcohols having 3-12 carbons which may be straight-chain, branched, or cyclic such as methylisobutylcarbinol (MIBC)); alicyclic alcohols (e.g., pine oils); and carboxy methyl cellulose ethers (CMC).

As used herein, the term "alkyl" denotes a straight-chain or branched alkyl radical having 1-22 carbons (preferably having 1-18, 1-12, or 1-6 carbons), in all its isomeric forms. As used herein, the term "alkenyl" denotes a straight-chain or branched alkenyl radical having 2-22 carbons (preferably having 2-18, 2-12, or 2-6 carbons), in all its isomeric forms.

ILLUSTRATIVE EMBODIMENTS

The following embodiments are illustrative and are not intended to limit the disclosed subject matter.

Embodiment 1

An ore slurry comprising: (a) sulfide ore; (b) water; (c) a lignosulfonate or a salt thereof (e.g., a lignosulfonate or a salt thereof suitable as a gangue depressant), wherein the lignosulfonate is isolated from a hardwood lignin tree and has a weight average molecular weight of about 3 kDa to about 12 kDa (preferably about 4 kDa to about 10 kDa, more preferably about 5.5 kDa to about 9 kDa); and (d) a processing reagent selected from the group consisting of a flotation reagent, a frothing reagent, a collector reagent, and an extractor reagent; wherein the slurry does not comprise cyanide or a salt thereof.

Embodiment 2

The ore slurry of embodiment 1, wherein the hardwood lignin tree is a Eucalyptus, Maple or Birch tree.

Embodiment 3

The ore slurry of embodiment 1 or 2, wherein the ore comprises copper sulfide.

Embodiment 4

The ore slurry of any of embodiments 1-3, wherein the ore comprises zinc sulfide.

Embodiment 5

The ore slurry of any of embodiments 1-4, wherein the ore comprises lead sulfide.

Embodiment 6

The ore slurry of any of embodiments 1-5, wherein the ore comprises an iron compound selected from the group consisting of pyrrhotite, pyrite, and marcasite.

Embodiment 7

The ore slurry of any of embodiments 1-6, wherein the slurry has a pH that is greater than about 8.

Embodiment 8

The ore slurry of any of embodiments 1-7, wherein the slurry has a pH that is greater than about 10.

Embodiment 9

The ore slurry of any of embodiments 1-8, wherein the slurry has a pH that is between about 9.5 and about 11.5.

Embodiment 10

The ore slurry of any of embodiments 1-9, wherein the slurry comprises lignosulfonate or the salt thereof as a gangue depressant and comprises no other gangue depressant.

Embodiment 11

The ore slurry of any of embodiments 1-10, wherein the salt of the lignosulfonate is selected from the group consisting of sodium lignosulfonate, potassium lignosulfonate, calcium lignosulfonate, or mixtures thereof.

Embodiment 12

The ore slurry of any of embodiments 1-11, wherein the flotation reagent, the frothing reagent, the collector reagent, or the extractor reagent comprises an aliphatic alcohol having 3-12 carbons which may be straight-chain, branched, or cyclic.

Embodiment 13

The ore slurry of embodiment 12, wherein the aliphatic alcohol is methylisobutylcarbinol (MIBC).

Embodiment 14

The ore slurry of any of embodiments 1-13, wherein the flotation reagent, the frothing reagent, the collector reagent, or the extractor reagent comprises a xanthate.

Embodiment 15

The ore slurry of any of embodiments 1-14, wherein the flotation reagent, the frothing reagent, the collector reagent, or the extractor reagent comprises a reagent selected from the group consisting of a thionocarbamate, a thiophosphate, and a thiourea.

Embodiment 16

The ore slurry of any of embodiments 1-15, further comprising sodium carbonate.

Embodiment 17

The ore slurry of any of embodiments 1-16, further comprising calcium hydroxide.

Embodiment 18

The ore slurry of any of embodiments 1-17, wherein the slurry does not comprise starch or dextrin which has been treated with an alkaline solution.

Embodiment 19

The ore slurry of any of embodiments 1-18, wherein the slurry does not comprise a polyacrylate.

Embodiment 20

The ore slurry of any of embodiments 1-19, wherein the slurry does not comprise quebracho, dextrin, or guar gum.

Embodiment 21

The ore slurry of any of embodiments 1-20, wherein the slurry comprises an effective amount of the lignosulfonate or a salt thereof for depressing gangue in a flotation method for isolating metal sulfide from the ore.

Embodiment 22

A method of recovering a metal sulfide from an ore, the method comprising: (a) adding a lignosulfonate or a salt thereof to the ore (e.g., a lignosulfonate or a salt thereof suitable as a gangue depressant), wherein the lignosulfonate comprises a hardwood lignosulfonate (e.g., a purified hardwood lignosulfonate) having a weight average molecular weight of about 3 kDa to about 12 kDa (preferably about 4 kDa to about 10 kDa, more preferably about 5.5 kDa to about 9 kDa); (b) adding at least one of a flotation reagent, a frothing reagent, a collector reagent, and an extractor reagent to the ore; (c) preparing an ore slurry, wherein the ore slurry has a pH that is basic; (d) introducing air into the ore slurry to create a frothed fraction, wherein the metal sulfide is at least partially suspended in the frothed fraction; and (e) removing the frothed fraction from the ore slurry, thereby recovering the metal sulfide; wherein the method does not comprise adding cyanide or a salt thereof to the ore or the ore slurry.

Embodiment 23

The method of embodiment 22, wherein the hardwood lignin tree is a Eucalyptus, Maple, or Birch tree.

Embodiment 24

The method of embodiment 22 or 23, wherein the metal sulfide comprises copper sulfide.

Embodiment 25

The method of any of embodiments 22-24, wherein the metal sulfide comprises zinc sulfide.

Embodiment 26

The method of any of embodiments 22-25, wherein the metal sulfide comprises lead sulfide.

Embodiment 27

The method of any of embodiments 22-26, wherein the ore slurry has a pH that is greater than about 8.

Embodiment 28

The method of any of embodiments 22-27, wherein the ore slurry has a pH that is greater than about 10.

Embodiment 29

The method of any of embodiments 22-28, wherein the ore slurry has a pH that is between about 9.5 and about 11.5.

Embodiment 30

The method of any of embodiments 22-29, wherein the ore slurry comprises lignosulfonate or the salt thereof as a gangue depressant and comprises no other gangue depressant.

Embodiment 31

The method of any of embodiments 22-30, wherein the salt of the lignosulfonate is selected from the group consisting of sodium lignosulfonate, potassium lignosulfonate, calcium lignosulfonate, or mixtures thereof.

Embodiment 32

The method of any of embodiments 22-31, wherein the flotation reagent, the frothing reagent, the collector reagent, or the extractor reagent comprises an aliphatic alcohol having 3-12 carbons which may be straight-chain, branched, or cyclic.

Embodiment 33

The method of embodiment 32, wherein the aliphatic alcohol is methylisobutylcarbinol (MIBC).

Embodiment 34

The method of any of embodiments 22-33, wherein the flotation reagent, the frothing reagent, the collector reagent, or the extractor reagent comprises a xanthate.

Embodiment 35

The method of any of embodiments 22-34, wherein the flotation reagent, the frothing reagent, the collector reagent, or the extractor reagent comprises a reagent selected from the group consisting of a thionocarbamate, a thiophosphate, and a thiourea.

Embodiment 36

The method of any of embodiments 22-35, further comprising adding sodium carbonate to the ore or the ore slurry.

Embodiment 37

The method of any of embodiments 22-36, further comprising adding calcium hydroxide to the ore or the ore slurry.

Embodiment 38

The method of any of embodiments 22-37, wherein the method does not comprise adding to the ore or the ore slurry a starch or dextrin which has been treated with an alkaline solution.

Embodiment 39

The method of any of embodiments 22-38, wherein the method does not comprise adding to the ore or the ore slurry a polyacrylate.

Embodiment 40

The method of any of embodiments 22-39, wherein the method does not comprise adding to the ore or the ore slurry quebracho, dextrin, or guar gum.

Embodiment 41

The method of any of embodiments 22-40, wherein the slurry comprises an effective amount of the lignosulfonate or a salt thereof for depressing gangue in a flotation method for isolating metal sulfide from the ore.

Embodiment 42

A method of recovering a metal sulfide from an ore, the method comprising: (a) preparing an ore slurry, wherein the ore slurry has a pH that is basic; (b) adding a lignosulfonate or a salt thereof to the ore slurry (e.g., a lignosulfonate or a salt thereof suitable as a gangue depressant), wherein the lignosulfonate comprises a hardwood lignosulfonate (e.g., a purified hardwood lignosulfonate derived from Eucalyptus, Maple or Birch hardwood lignosulfonate) having a weight average molecular weight of about 3 kDa to about 12 kDa (preferably about 4 kDa to about 10 kDa, more preferably about 5.5 kDa to about 9 kDa); (c) adding at least one of a flotation reagent, a frothing reagent, a collector reagent, and an extractor reagent to the ore slurry; (d) introducing air into the ore slurry to create a frothed fraction, wherein the metal sulfide is at least partially suspended in the frothed fraction; and (e) removing the frothed fraction from the ore slurry, thereby recovering the metal sulfide; wherein the method does not comprise adding cyanide or a salt thereof to the ore or the ore slurry.

Embodiment 43

The method of embodiment 42, wherein the hardwood lignin tree is a Eucalyptus, Maple, or Birch tree.

Embodiment 44

The method of embodiment 42 or 43, wherein the metal sulfide comprises copper sulfide.

Embodiment 45

The method of any of embodiments 42-44, wherein the metal sulfide comprises zinc sulfide.

Embodiment 46

The method of any of embodiments 42-45, wherein the metal sulfide comprises lead sulfide.

Embodiment 47

The method of any of embodiments 42-46, wherein the ore slurry has a pH that is greater than about 8.

Embodiment 48

The method of any of embodiments 42-47, wherein the ore slurry has a pH that is greater than about 10.

Embodiment 49

The method of any of embodiments 42-48, wherein the ore slurry has a pH that is between about 9.5 and about 11.5.

Embodiment 50

The method of any of embodiments 42-49, wherein the gangue depressant consists of the lignosulfonate or the salt thereof.

Embodiment 51

The method of any of embodiments 42-50, wherein the salt of the lignosulfonate is selected from the group consisting of sodium lignosulfonate, potassium lignosulfonate, calcium lignosulfonate, or mixtures thereof.

Embodiment 52

The method of any of embodiments 42-51, wherein the flotation reagent, the frothing reagent, the collector reagent, or the extractor reagent comprises an aliphatic alcohol having 3-12 carbons which may be straight-chain, branched, or cyclic.

Embodiment 53

The method of embodiment 52, wherein the aliphatic alcohol is methylisobutylcarbinol (MIBC).

Embodiment 54

The method of any of embodiments 42-53, wherein the flotation reagent, the frothing reagent, the collector reagent, or the extractor reagent comprises a xanthate.

Embodiment 55

The method of any of embodiments 42-54, wherein the flotation reagent, the frothing reagent, the collector reagent, or the extractor reagent comprises a reagent selected from the group consisting of a thionocarbamate, a thiophosphate, and a thiourea.

Embodiment 56

The method of any of embodiments 42-55, further comprising adding sodium carbonate to the ore or the ore slurry.

Embodiment 57

The method of any of embodiments 42-56, further comprising adding calcium hydroxide to the ore or the ore slurry.

Embodiment 58

The method of any of embodiments 42-57, wherein the method does not comprise adding to the ore or the ore slurry a starch or dextrin which has been treated with an alkaline solution.

Embodiment 59

The method of any of embodiments 42-58, wherein the method does not comprise adding to the ore or the ore slurry a polyacrylate.

Embodiment 60

The method of any of embodiments 42-59, wherein the method does not comprise adding to the ore or the ore slurry quebracho, dextrin, or guar gum.

Embodiment 61

The method of any of embodiments 42-60, wherein the slurry comprises an effective amount of the lignosulfonate or a salt thereof for depressing gangue in a flotation method for isolating metal sulfide from the ore.

EXAMPLES

The following examples are illustrative and are not intended to limit the disclosed subject matter.

Example 1

Preparation of Lignosulfonate Products

Two lignosulfonate products were prepared, D-748 and D-912. The D-748 product was prepared by fermenting softwood lignosulfonate and subsequently subjecting the fermented softwood lignosulfonate to ultrafiltration. The D-912 product was derived from hardwood lignosulfonate and was processed in order to remove a substantial portion of the oxidizable sugars that are commonly present in technical grade lignosulfonate. Table 1 provides an analytical summary of the D-748 and D-912 products and for comparison, Kelig 100, which is observed to have a higher sulfur content and sulfonate content.

TABLE 1

| Product | pH | Ca (%) | Na (%) | Total Sulfur (%) | Sulfonate Sulfur (%) | Sugar Content (%) | $\lambda_{max}$ (nm) | Mw (kDa) |
|---|---|---|---|---|---|---|---|---|
| D-748 | 8.7 | 0.0 | 7.0 | 6.5 | 6.2 | 1.0 | 281 | 50 |
| D-912 | 7.3 | 8.0 | 0.1 | 6.5 | 5.0 | 2.0 | 277 | 6 |
| Kelig 100 | 9.5 | 0.1 | 15.9 | 11.1 | 8.1 | 0.0 | 280 | 12.5 |

Example 2

Copper/Zinc Sulfide Ore

A sulfide ore from a mine in Peru was tested and contained approximately 4.2% copper and 4.8% zinc. This ore was subjected to flotation under the following standard conditions.

All samples were riffle split into 1000 gram charges from an ore sample passing 6-mesh. For each flotation sample, the ore was ground for such a time that 80% of the ore passed 150 mesh screen. Slake lime was used as a pH modifier and added to the grinding phase, as were the lignosulfonate products D-912 and D-748 as gangue depressant. (See Table 2 for description of samples.)

TABLE 2

| Sample No. | Depressant Type | Depressant Amount (g/MT) | pH |
|---|---|---|---|
| 1 | None | 0 | 10.3 |
| 2 | NaCN | 250 | 10.3 |
| 3 | NaCN | 325 | 10.1 |
| 4 | D-912 | 175 | 10.3 |
| 5 | D-912 | 250 | 10.3 |
| 6 | D-912 | 325 | 10.0 |
| 7 | D-912 | 500 | 10.5 |
| 8 | D-748 | 250 | 10.5 |
| 9 | D-748 | 500 | 10.3 |
| 10 | D-748 | 1500 | 10.5 |
| 11 | D-748 + soda ash | 1500 | 10.1 |

After grinding, a collector (Aero promoter AP3894) and MIBC (methylisobutylcarbinol) were added, and the pulp was conditioned for a time of 3 minutes. This was followed by recovery of the concentrate (frothed fraction) via froth flotation for 8 minutes using a Denver laboratory flotation cell. The pulp density was determined as 25%.

The collected froth was analyzed and yielded the results shown in Tables 3 and 4. Samples 2 and 3 included sodium cyanide at two concentrations. Samples 4-7 and Samples 8 and 9 included lignin products D-912 and D-748, respectively, at several concentrations.

TABLE 3

Concentrate Analysis

| Sample No. | Wt (g) | Copper Grade (%) | Copper Recovery (%) | Zinc Grade (%) | Zinc Recovery (%) | Iron Grade (%) | Iron Recovery (%) |
|---|---|---|---|---|---|---|---|
| Head | 1000 | 4.2 | 100.0 | 4.8 | 100.0 | 38.3 | 100.0 |
| 1 | 355 | 9.7 | 88.7 | 9.8 | 87.2 | 34.2 | 30.9 |
| 2 | 190 | 13.9 | 66.8 | 14.9 | 62.3 | 27.7 | 14.2 |
| 3 | 132 | 17.9 | 57.3 | 17.3 | 51.0 | 24.9 | 8.7 |
| 4 | 213 | 13.2 | 67.4 | 15.3 | 72.1 | 29.5 | 16.2 |
| 5 | 221 | 14.2 | 70.9 | 17.2 | 74.2 | 27.8 | 16.9 |
| 6 | 198 | 13.5 | 63.9 | 15.6 | 67.2 | 31.2 | 16.0 |
| 7 | 131 | 19.5 | 52.8 | 20.4 | 52.5 | 29.6 | 9.6 |
| 8 | 323 | 10.0 | 79.7 | 13.7 | 79.9 | 34.4 | 27.6 |
| 9 | 231 | 12.1 | 70.8 | 15.3 | 76.5 | 30.5 | 19.3 |

TABLE 4

Tails Analysis

| Sample No. | Wt | Available Cu (%) | Available Zn (%) | Available Fe (%) |
|---|---|---|---|---|
| 1 | 643 | 11.11 | 12.85 | 69.09 |
| 2 | 810 | 33.2 | 37.7 | 85.8 |
| 3 | 868 | 42.7 | 49 | 91.3 |
| 4 | 787 | 32.6 | 27.9 | 83.8 |
| 5 | 779 | 29.1 | 25.8 | 83.1 |
| 6 | 802 | 36.1 | 32.8 | 84.0 |
| 7 | 869 | 47.2 | 47.5 | 90.4 |
| 8 | 677 | 20.3 | 20.1 | 72.4 |
| 9 | 769 | 29.2 | 23.5 | 80.7 |

TABLE 5

Depressant Activity

| Sample No. | Cu Recovery (%) vs. Fe Recovery (%) | Zn Recovery (%) vs. Fe Recovery (%) | Reduction in Fe Recovery (%*) |
|---|---|---|---|
| Head | 1 | 1 | NA |
| 1 | 2.87 | 2.82 | NA |
| 2 | 4.70 | 4.39 | 0.54 |
| 3 | 6.59 | 5.86 | 0.72 |
| 4 | 4.16 | 4.45 | 0.48 |
| 5 | 4.20 | 4.39 | 0.45 |
| 6 | 3.99 | 4.20 | 0.48 |
| 7 | 5.50 | 5.47 | 0.69 |
| 8 | 2.89 | 2.89 | 0.11 |
| 9 | 3.67 | 3.96 | 0.38 |

*versus Sample No. 1 (no depressant added)

Figure 2:
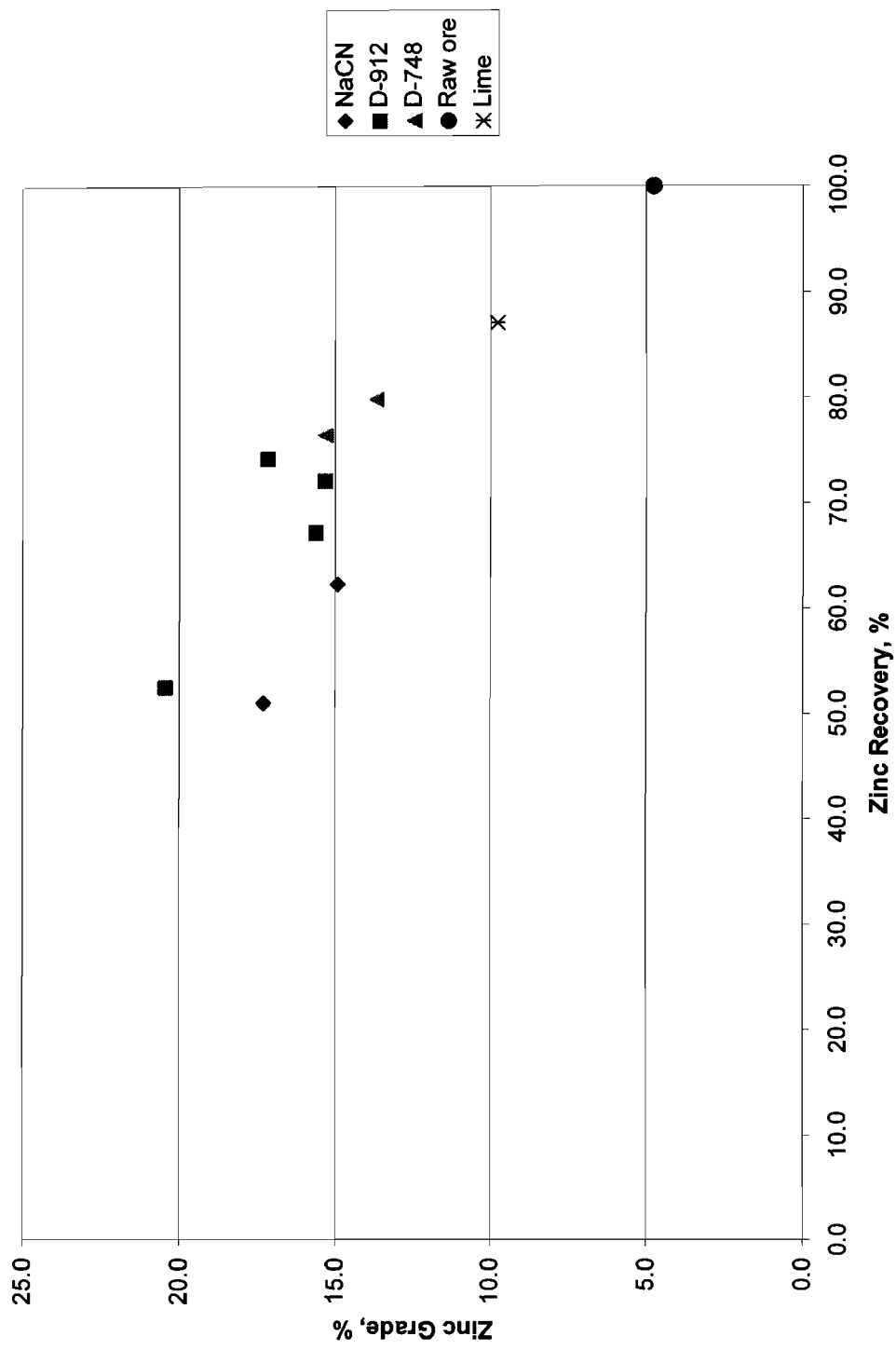
FIG. 2 is a plot graph of zinc grade % (i.e., weight percentage zinc in the concentrated ore) versus zinc recovery % (i.e., weight zinc in the concentrated ore relative to total weight zinc in the ore).

The % recovery vs. % grade were plotted for each metal and compared to the samples that included sodium cyanide (250 and 325 g/MT) (See FIGS. 1 and 2.) The results indicated that both additives D-912 and D-748 display gangue depressant activity. In the case of copper the depression activity was similar to sodium cyanide, and in the case of zinc the depression activity was superior to sodium cyanide. Use of the D-912 additive resulted in a decrease of iron recovery (%) ranging from 48-69% (at least about 45%) in comparison to Sample 1, where no additive was used. (See Table 5.)

Example 3

Zinc/Lead Sulfide Ore

A sulfide ore from a mine in Peru was tested and contained approximately 0.7% lead, 13% zinc and 15% iron. The ore was subjected to flotation under the following conditions.

The testing was performed using a Denver laboratory flotation cell per the conditions described in Table 6.

TABLE 6

| Flotation Step | Reagent dose, g/MT | | | | | | | Time, Minutes | | | |
| | CaO | MIBC | CNNa or Lignosulfonate Material | SIX | CuSO₄ | Flotanol | Dextrin | Milling | Condition. | Flot. | pH |
|---|---|---|---|---|---|---|---|---|---|---|---|
| Mill Carbon Prefloat | | | | | | | | 14 | | | |
| Conditioning Carbon Rougher Lead Flotation | X | 36 | | | | | | | 1 | 2 | 10.9 |
| Conditioning Pb Rougher Pb Scavenger Zinc Flotation | X | 4 | 30 | 30 | 5 | | | | 3 | 3 1 | 10.90 |
| Conditioning 1 Conditioning 2 | X | | | | 750 | | 50 | | 3 3 | | 11.07 |

TABLE 6-continued

| Flotation Step | Reagent dose, g/MT | | | | | | | Time, Minutes | | | |
|---|---|---|---|---|---|---|---|---|---|---|---|
| | CaO | MIBC | CNNa or Lignosulfonate Material | SIX | CuSO$_4$ | Flotanol | Dextrin | Milling | Condition. | Flot. | pH |
| Conditioning 3 | | | | 30 | | 32 | | | 3 | | |
| Zn Rougher | | | | | | | | | | 3 | |
| Zn Scavenger | | | | 5 | | 8 | | | 1 | | 3 |

1. Ca(OH)$_2$: Slake lime used to adjust pH
2. MIBC: Methylisobutylcarbanol, 100%
3. CNNa: Sodiumcyanide, 2% solution
4. SIX: Sodium isopropyl xanthate
5. CuSO$_4$: Copper sulfate The separation consisted of three stages with the first flotation step designed to remove unwanted carbon, the second step designed to recover lead, and the final step designed to recover zinc. All samples were riffle split into 2000 g charges from an ore sample passing a 10 mesh screen. For each flotation sample, the ore was ground for such a time that 55% of the ore passed a 200 mesh screen. Slake lime was used throughout the flotation experiments to keep the pH at 11±0.2.

The collected froth was dried, weighed, and analyzed. (See Table 7).

TABLE 7

LEAD CIRCUIT

| test | Concentrate (Wt., g) | Pb Grade, % | Pb Recovery, % | Fe Recovery, % | Pb Recovery, %/ Fe Recovery, % |
|---|---|---|---|---|---|
| D-748 | 72.2 | 8.4 | 43.2 | 3.4 | 12.71 |
| NaCN | 68.8 | 10.2 | 50.2 | 2.5 | 20.08 |
| D-912 | 72.7 | 5.4 | 39.5 | 1.9 | 20.79 |
| blank | 109.37 | 10.6 | 84.0 | 8.3 | 10.12 |

ZINC CIRCUIT

| test | Concentrate (Wt., g) | Zn Grade, % | Zn Recovery, % | Fe Recovery, % | Zn Recovery, %/ Fe Recovery, % |
|---|---|---|---|---|---|
| D-748 | 442.4 | 44.78 | 88.70 | 11.90 | 7.45 |
| NaCN | 447.8 | 50.46 | 88.40 | 13.84 | 6.39 |
| D-912 | 434.63 | 60.32 | 89.47 | 10.91 | 8.20 |
| blank | 437.31 | 52.91 | 86.60 | 21.61 | 4.01 |

The data indicates that the D-912 and D-748 products have gangue depressant activity and provide a concentrated ore fraction having a higher lead or zinc % recovery relative to iron % recovery than the sample having no gangue depressant. In addition, the D-912 and D-748 products displayed superior gangue depressant activities in comparison to sodium cyanide for zinc.

Example 4

Effect of Soda Ash in Combination with Lignosulfonate

The same flotation procedure used in Example 2 was used in this example except that soda ash rather than slake lime was used as a pH modifier to bring the pH of the system to about 10. Sodium carbonate (soda ash) was used as the pH modifier to measure the effect of rendering most divalent ions (e.g., calcium cations) in the sample insoluble during the flotation process. Soda ash was added to the grinding phase, as were the gangue depressants. After grinding, a collector (Aero promoter AP3894) and MIBC (methylisobutylcarbinol) were added, and the pulp was conditioned for a time of 3 minutes. This was followed by recovering the concentrate (frothed fraction) via froth flotation for 8 minutes using a Denver laboratory flotation cell. The pulp density was determined to be 25%.

Figure 3:
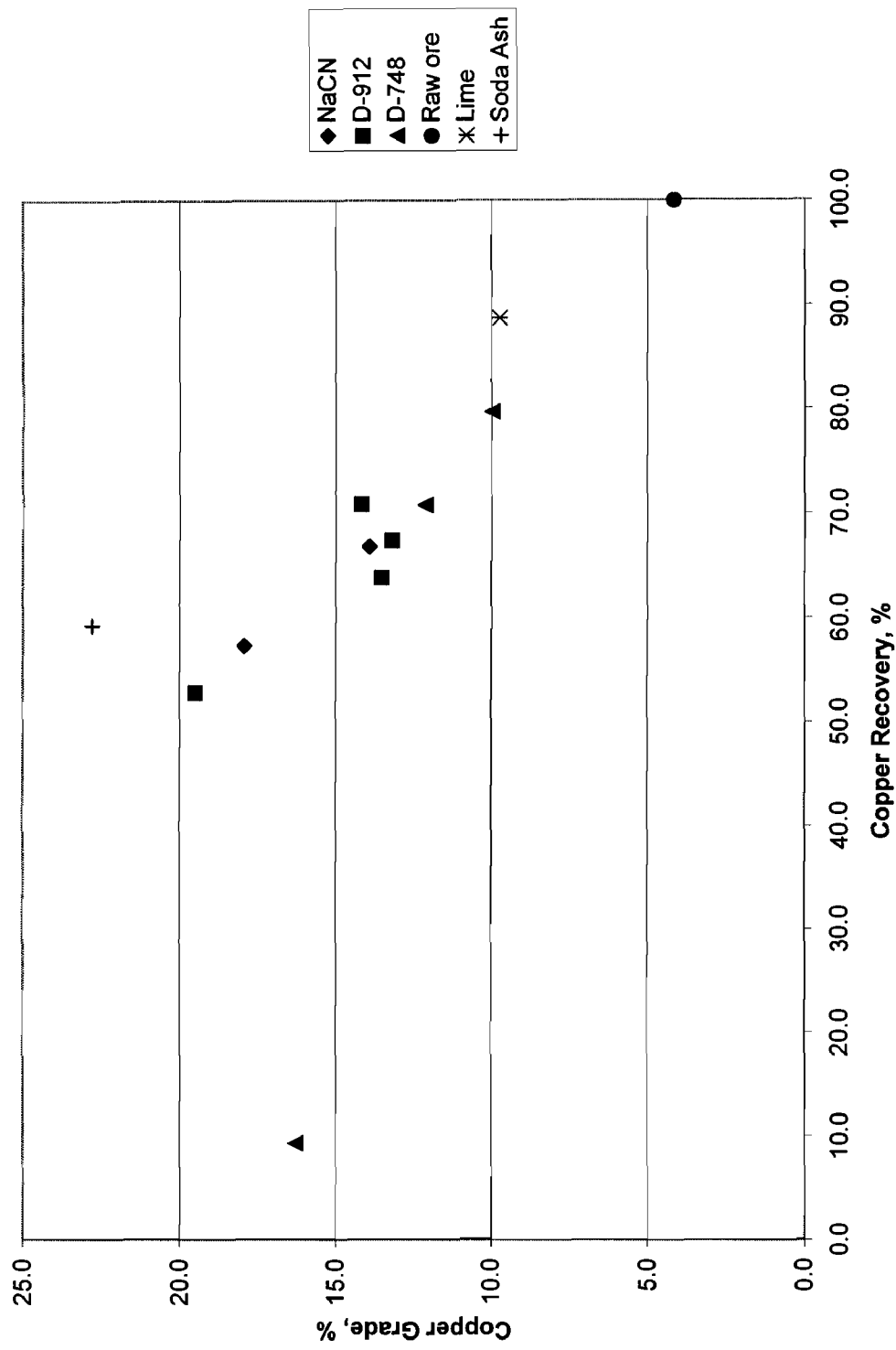
FIG. 3 is a plot graph of copper grade % (i.e., weight percentage copper in the concentrated ore) versus copper recovery % (i.e., weight copper in the concentrated ore relative to total weight copper in the ore) from an ore slurry containing the D-912 product, the D-748 product, sodium cyanide, lime, or the D-748 product in combination with soda ash.
Figure 4:
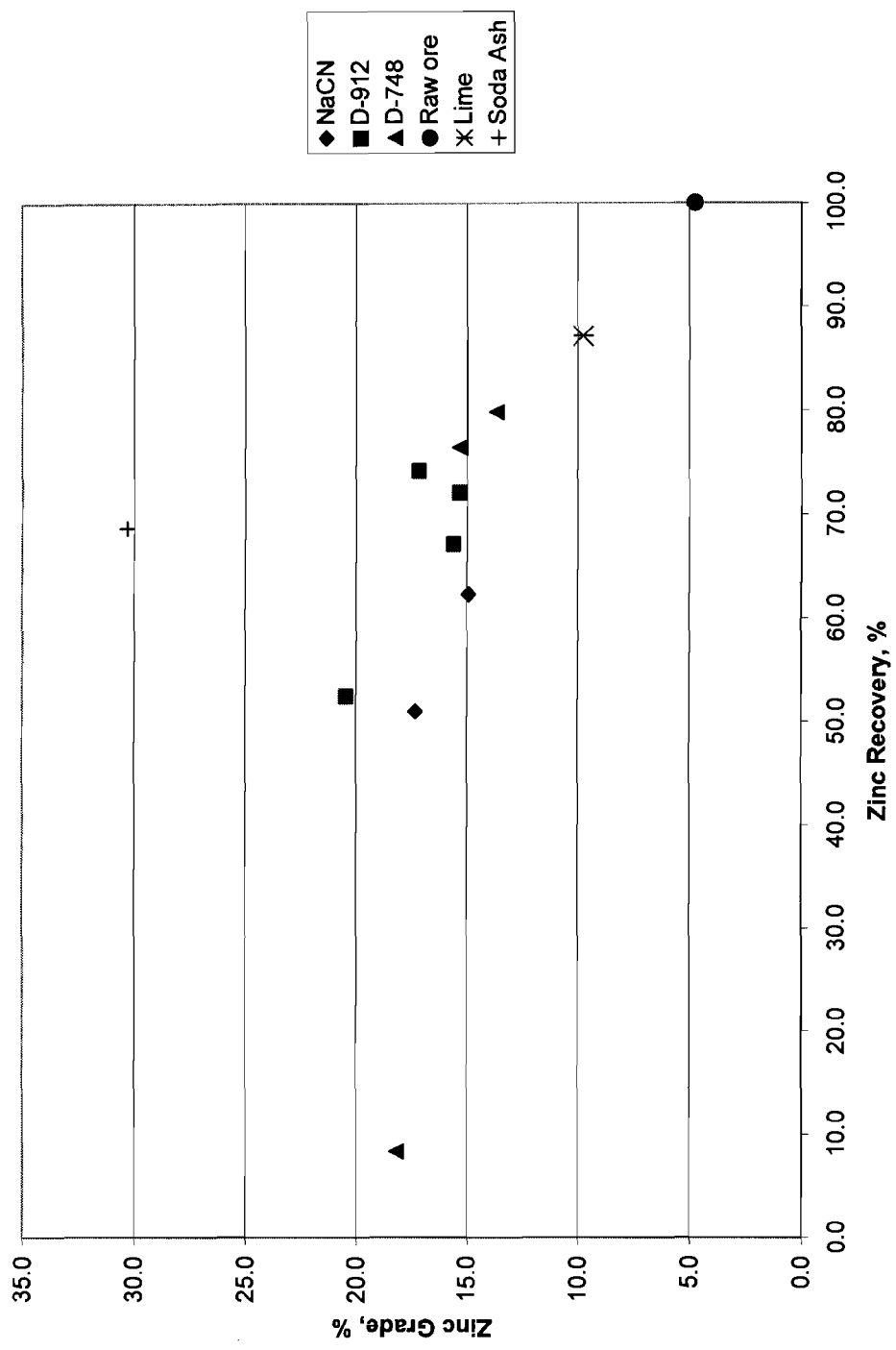
FIG. 4 is a plot graph of zinc grade % (i.e., weight percentage zinc in the concentrated ore) versus zinc recovery % (i.e., weight zinc in the concentrated ore relative to total weight zinc in the ore) from an ore slurry containing the D-912 product, the D-748 product, sodium cyanide, lime, or the D-748 product in combination with soda ash.

The collected froth was analyzed and yielded the results shown in Table 8 as well as FIGS. 3 and 4, which indicate that soda ash improves the grade % for recovered copper and zinc, respectively.

TABLE 8

| | | Concentrate Analysis | | | | | |
|---|---|---|---|---|---|---|---|
| | | Copper | | Zinc | | Iron | |
| Sample No. | Wt (g) | Grade (%) | Recovery (%) | Grade (%) | Recovery (%) | Grade (%) | Recovery (%) |
| Head | 1000 | 4.2 | 100.0 | 4.8 | 100.0 | 38.3 | 100.0 |
| 10 | 23 | 16.3 | 9.3 | 18.2 | 8.3 | 18.9 | 1.1 |
| 11 | 109 | 22.8 | 59.3 | 30.3 | 68.7 | 41.7 | 10.9 |

Example 5

Copper Sulfide Ore

A copper containing sulfide ore from Arizona was subjected to selective flotation. This ore contained approximately 0.4% copper and 0.9% iron. The following flotation procedure was used.

A large sample of crude ore was crushed such that it passing a 10 mesh screen. All flotation samples were riffle split from this large sample into 1000 gram charges. For each test the 1000 gram ore charge was place in a laboratory rod mill, combined with 666 g water and 1.1 g $Ca(OH)_2$. Pyrite depressants (0.1 lbs./MT) were also added to mill prior milling. The ore, water, lime and depressant were milled until 40% of the ore material passed 65 mesh screen. The slurry was immediately placed in a Denver Laboratory Flotation Cell and subjected to froth flotation. A collector was added (0.01 gram Cytec 10059) and the sample conditioned at 1300 rpm for 1 minute. Following this conditioning step, a frother was immediately added (0.015 g Cytec X133) and the sample was again conditioned for 1 minute. After these conditioning steps, two separate flotation concentrates were collected. A rougher concentrate was collected for 1 minute. This was immediately followed by collection of a scavenger concentrate over 5 minutes. The rougher, scavenger and tails were collected and dried. A portion of each fraction was subjected to acid digestion in a microwave digester, followed by analysis by ICP for copper and iron content. The analytical results are displayed in Table 9.

Figure 5:
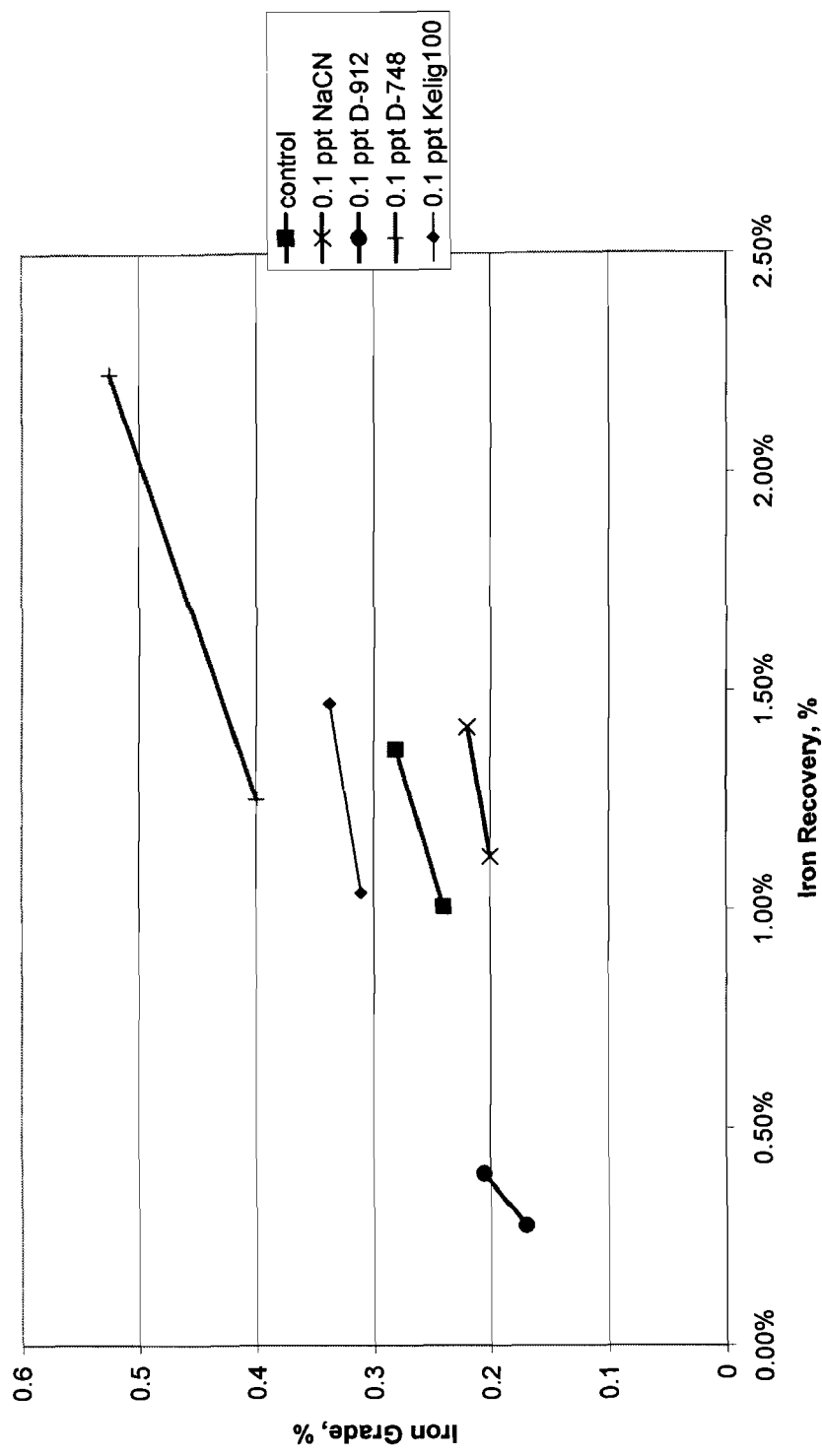
FIG. 5 is a plot graph of cumulative copper grade (%) versus cumulative copper recovery (%) (rougher, rougher+ scavenger) for a copper sulfide ore slurry containing the D-912 product, the D-748 product, the Kelig 100 product, or sodium cyanide.
Figure 6:
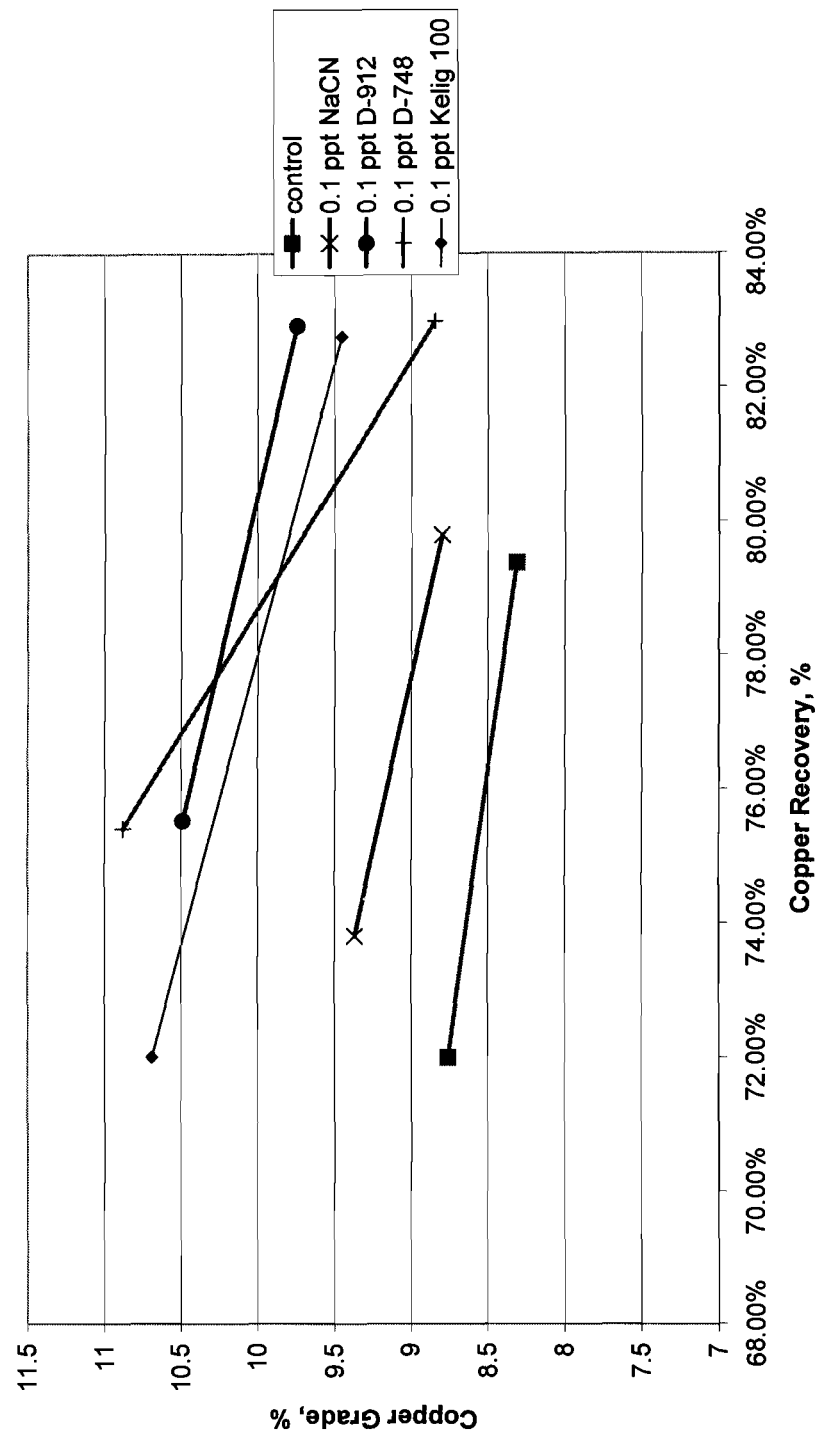
FIG. 6 is a plot graph of cumulative iron grade (%) versus cumulative iron recovery (%) (rougher, rougher+scavenger) for a copper sulfide ore slurry containing the D-912 product, the D-748 product, the Kelig 100 product, or sodium cyanide.

FIG. 5 displays a graph copper grade versus copper recovery. FIG. 6 displays a graph of iron grade versus iron recovery.

The data illustrate that D-912 rejected more iron than the control which lacked depressant, and that D-912 rejected more iron than sodium cyanide. Furthermore, using D-912 as a depressant, a higher grade and recovery of Copper from this ore was obtained. The data also show that D-912 is superior to Kelig 100 or the softwood lignosulfonate D-748 in terms of iron rejection and copper concentration.

We claim:
1. An ore slurry comprising:
   (a) a metal sulfide ore;
   (b) water;
   (c) a depressant consisting essentially of a hardwood lignin sulfonate, wherein:
      (i) the lignin sulfonate has a weight average molecular weight of about 3 kDa to about 12 kDa;
      (ii) the lignin sulfonate has a total sulfur content of less than about 10.0% (w/w); and
      (iii) the lignin sulfonate has a sulfonate content of less than about 7.5% (w/w); and
   (d) a processing reagent for facilitating separation of a metal sulfide present in the ore from gangue.
2. The ore slurry of claim 1, wherein the slurry does not comprise cyanide or a salt thereof.
3. The ore slurry of claim 1 or 2, wherein the processing reagent is a reagent selected from the group consisting of a flotation reagent, a frothing reagent, a collector reagent, and an extractor reagent.

TABLE 9

| Depressant (dose) | Sample | weight recovered (g) | Cu Grade (%) | Cu Recovery (%) | Fe Grade (%) | Fe Recovery (%) |
|---|---|---|---|---|---|---|
| | Head (average) | 1000 | 0.40 | 100.00 | 0.92 | 100.00 |
| none (0 #/MT) | Tails | 957.3 | 0.08 | 20.60 | 0.75 | 98.60 |
| | rougher | 30.5 | 8.76 | 72.00 | 0.24 | 1.01 |
| | scavenger | 4.9 | 5.56 | 7.38 | 0.53 | 0.36 |
| | combined | 35.4 | 8.31 | 79.38 | 0.28 | 1.37 |
| Kelig 100 (0.1 #/MT) | Tails | 960.9 | 0.07 | 17.25 | 0.85 | 98.50 |
| | rougher | 27.8 | 10.69 | 72.00 | 0.31 | 1.04 |
| | scavenger | 8.3 | 5.32 | 10.75 | 0.43 | 0.43 |
| | combined | 36.1 | 9.46 | 82.75 | 0.34 | 1.47 |
| NaCN (0.1 #/MT) | Tails | 961.7 | 0.09 | 20.20 | 0.59 | 98.60 |
| | rougher | 32.2 | 9.37 | 73.80 | 0.20 | 1.12 |
| | scavenger | 54.9 | 5.04 | 6.00 | 0.35 | 0.30 |
| | combined | 37.1 | 8.80 | 79.80 | 0.22 | 1.42 |
| D-748 (0.1 #/MT) | Tails | 961.2 | 0.07 | 17.02 | 0.89 | 97.80 |
| | rougher | 27.4 | 10.88 | 75.40 | 0.40 | 1.25 |
| | scavenger | 9.7 | 3.10 | 7.58 | 0.88 | 0.97 |
| | combined | 37.1 | 8.85 | 82.98 | 0.53 | 2.23 |
| D-912 (0.1 #/MT) | Tails | 974.9 | 0.07 | 17.08 | 1.80 | 99.60 |
| | rougher | 28.8 | 10.49 | 75.52 | 0.17 | 0.28 |
| | scavenger | 5.2 | 5.64 | 7.40 | 0.40 | 0.12 |
| | combined | 34.0 | 9.74 | 82.90 | 0.21 | 0.40 |

4. The ore slurry of claim 1, wherein the lignin sulfonate has a $\lambda_{max}$ of 276-277 nm.

5. The ore slurry of claim 1, wherein the hardwood lignin sulfonate has a pH of less than about 9.0 in aqueous solution.

6. The ore slurry of claim 1, wherein the hardwood lignin sulfonate is derived from a Eucalyptus tree, a Maple tree, or a Birch tree.

7. The ore slurry of claim 1, wherein the ore comprises copper sulfide.

8. The ore slurry of claim 1, wherein the ore comprises zinc sulfide.

9. The ore slurry of claim 1, wherein the ore comprises lead sulfide.

10. The ore slurry of claim 1, wherein the ore comprises an iron compound selected from the group consisting of pyrrhotite, pyrite, and marcasite.

11. The ore slurry of claim 1, wherein the slurry has a pH that is greater than about 9.

12. The ore slurry of claim 1, wherein the slurry has a pH that is between about 9.5 and about 11.5.

13. The ore slurry of claim 1, wherein the hardwood lignin sulfonate is present in the ore slurry at a concentration of about 250-500 g/mt.

14. The ore slurry of claim 1, wherein the salt of the lignin sulfonate is selected from the group consisting of sodium lignin sulfonate, potassium lignin sulfonate, calcium lignin sulfonate, or mixtures thereof.

15. The ore slurry of claim 1, wherein the processing reagent is an aliphatic alcohol having 3-12 carbons which may be straight-chain, branched, or cyclic.

16. The ore slurry of claim 15, wherein the aliphatic alcohol is methylisobutylcarbinol (MIBC).

17. The ore slurry of claim 1, wherein the processing reagent is a xanthate.

18. The ore slurry of claim 1, wherein the processing reagent is a reagent selected from the group consisting of a thionocarbamate, a thiophosphate, and a thiourea.

19. The ore slurry of claim 1, wherein the processing reagent is a surfactant.

20. The ore slurry of claim 1, further comprising sodium carbonate.

21. The ore slurry of claim 1, further comprising calcium hydroxide.

22. The ore slurry of claim 1, wherein the slurry does not comprise any of the following components: starch; dextrin or dextrin that has been treated with an alkaline solution; quebracho; guar gum; or polyacrylate.

23. A method of recovering the metal sulfide from the ore slurry of claim 1, the method comprising:
 (a) introducing air into the ore slurry to create a frothed fraction, wherein the metal sulfide is at least partially suspended in the frothed fraction; and
 (b) removing the frothed fraction from the ore slurry, thereby recovering the metal sulfide.

24. A method of recovering a metal sulfide from an ore, the method comprising:
 (a) adding to the ore a depressant consisting essentially of a hardwood lignin sulfonate, wherein:
  (i) the lignin sulfonate has a weight average molecular weight of about 3 kDa to about 12 kDa;
  (ii) the lignin sulfonate has a total sulfur content of less than about 10.0% (w/w); and
  (iii) the lignin sulfonate has a sulfonate content of less than about 7.5% (w/w); and
 (b) adding to the ore a processing reagent for facilitating separation of a metal sulfide present in the ore from gangue;
 (c) preparing a slurry of the ore, wherein the ore slurry has a pH that is basic;
 (d) introducing air into the ore slurry to create a frothed fraction, wherein the metal sulfide is at least partially suspended in the frothed fraction; and
 (e) removing the frothed fraction from the ore slurry, thereby recovering the metal sulfide.

25. The method of claim 24, wherein the method does not comprise adding cyanide or a salt thereof to the ore or the ore slurry.

26. The method of claim 24 or 25, wherein the processing reagent is a reagent selected from the group consisting of a flotation reagent, a frothing reagent, a collector reagent, and an extractor reagent.

27. The method of claim 24, wherein the lignin sulfonate has a $\lambda_{max}$ of 276-277 nm.

28. The method of claim 24, wherein the hardwood lignin sulfonate has a pH of less than about 9.0 in aqueous solution.

29. The method of claim 24, wherein the hardwood lignin sulfonate is derived from a Eucalyptus tree, a Maple tree, or a Birch tree.

30. A method of recovering a metal sulfide from an ore, the method comprising:
 (a) preparing an ore slurry, wherein the ore slurry has a pH that is basic,
 (b) adding to the ore slurry a depressant consisting essentially of a hardwood lignin sulfonate, wherein:
  (i) the lignin sulfonate has a weight average molecular weight of about 3 kDa to about 12 kDa;
  (ii) the lignin sulfonate has a total sulfur content of less than about 10.0% (w/w); and
  (iii) the lignin sulfonate has a sulfonate content of less than about 7.5% (w/w);
 (c) adding to the ore slurry a processing reagent for facilitating separation of a metal sulfide present in the ore from gangue;
 (d) introducing air into the ore slurry to create a frothed fraction, wherein the metal sulfide is at least partially suspended in the frothed fraction; and
 (e) removing the frothed fraction from the ore slurry, thereby recovering the metal sulfide.

31. The method of claim 30, wherein the method does not comprise adding cyanide or a salt thereof to the ore or the ore slurry.

32. The method of claim 30 or 31, wherein the processing reagent is a reagent selected from the group consisting of a flotation reagent, a frothing reagent, a collector reagent, and an extractor reagent.

33. The method of claim 30, wherein the lignin sulfonate has a $\lambda_{max}$ of 276-277 nm.

34. The method of claim 30, wherein the hardwood lignin sulfonate has a pH of less than about 9.0 in aqueous solution.

35. The method of claim 30, wherein the hardwood lignin sulfonate is derived from a Eucalyptus tree, a Maple tree, or a Birch tree.

* * * * *